United States Patent [19]
Smith

[11] 3,833,020
[45] Sept. 3, 1974

[54] APPARATUS FOR PLUGGING PIPE

[75] Inventor: Joseph B. Smith, Cleveland, Ohio

[73] Assignee: The Pipe Line Development Company, Cleveland, Ohio

[22] Filed: Nov. 8, 1971

[21] Appl. No.: 196,456

Related U.S. Application Data

[62] Division of Ser. No. 13,295, Feb. 24, 1970.

[52] U.S. Cl................ 138/94, 137/318, 166/55
[51] Int. Cl............................................. F16l 55/10
[58] Field of Search............ 138/90, 91, 92, 93, 94, 138/94.3, 94.5, 95, 96; 137/15, 317, 318; 251/214; 166/55

[56] References Cited
UNITED STATES PATENTS

| | | | |
|---|---|---|---|
| 2,820,482 | 1/1958 | Greenwood | 138/94.3 |
| 2,983,477 | 5/1961 | Merrill | 137/318 X |
| 3,170,226 | 2/1965 | Larry | 29/213 X |
| 3,590,920 | 7/1971 | Orund et al. | 166/55 |
| 3,687,166 | 8/1972 | Herrin | 138/94 |

Primary Examiner—William I. Price
Assistant Examiner—Steven M. Pollard
Attorney, Agent, or Firm—McNenny, Farrington, Pearne & Gordon

[57] ABSTRACT

An apparatus and method for blocking a conduit or pipe carrying fluid under pressure. The apparatus comprises a fluid tight housing adapted to be secured to the exterior of an intermediate portion of the pipe, a cutter or shear within the housing, an actuator for moving the shear through the wall of the pipe, and a sealing surface engageable with a portion of the pipe while the shear extends into the pipe.

21 Claims, 4 Drawing Figures

INVENTOR.
JOSEPH B. SMITH
BY

ATTORNEYS

INVENTOR
JOSEPH B. SMITH
BY

ATTORNEYS

APPARATUS FOR PLUGGING PIPE

This is a division, of application Ser. No. 13,295, filed Feb. 24, 1970.

BACKGROUND OF THE INVENTION

This invention relates to pipe plugging apparatus and more specifically to apparatus for blocking a pipe in service at a desired point in a pipeline system.

Various methods and devices have been proposed and used for stopping the flow or holding the pressure of fluid in a live pipeline. U.S. Pat. No. 2,655,339 to J. J. Smith and No. 2,812,778 to B. Ver Nooy, for example, disclose pipe stopping apparatus for use similar to that for which the present invention is intended. The types of devices disclosed in these patents have generally required a large hole to be drilled into the side of the pipe to be plugged. Since the plug is, for the most part, rigid, the drilled hole is necessarily as large as the inner diameter of the pipe. My U.S. Pat. No. 3,298,398 discloses an apparatus which does not require a full size hole to be drilled through the side of the pipe, but a non-rigid bag must be inserted through a hole and then expanded.

When a relatively large pipe, often greater than 12" in diameter, is to be plugged drilling operations become significant. Drilling a large hole requires substantial time and expensive tools and equipment. Metal chips and debris produced during drilling create problems by contaminating the pipeline.

Flow in a pipe being drilled may carry chips and debris to other areas of the pipeline system and cause extensive damage or require otherwise unnecessary preventative measures. Where chips remain in the area of the hole, they may have to be removed with elaborate suction apparatus to allow the plug to properly seal against the surfaces of the pipe.

After a hole has been drilled, the installation procedure required by these types of pipe stopping devices is likewise involved and time consuming. Ordinarily a sealed housing is provided around the area of the pipe where the hole is to be drilled. The drill or cutter operates within the sealed housing to prevent the escape of fluid. After the hole is completed the cutter normally must be extracted from the hole and the housing before the plug may be inserted.

To prevent fluid loss when the cutter is removed from the housing a gate valve or other device is normally provided with the housing to form a lock or pressure equalizing chamber. The cutter is retracted through the valve into the chamber and the valve is closed. Normally, the cutting apparatus is then dismounted from the housing and replaced by the plugging device. Care must be taken to insure that the lock or chamber is adequately sealed again before the gate valve is opened for passage of the plug into the pipe. The customary procedure of replacing the drilling apparatus with the plugging device while containing the pressurized fluid in the pipe, besides requiring extra equipment and time, may be somewhat sloppy and/or dangerous since fluid is necessarily exposed when the drilling apparatus is removed.

SUMMARY OF THE INVENTION

The invention provides an apparatus having a shear mounted in a fluid tight housing on the exterior of the pipe to be blocked. An actuator forces the shear through the pipe wall so that fluid may be blocked by a plug-off piston carried in the shear. The plug-off piston is actuated externally to seal against a sheared face of the pipe.

The apparatus eliminates the need for drilling operations and permits faster and simpler pipe plugging than has been possible with earlier devices. The shear may be forced through the pipe wall substantially faster than a drill of equivalent size may be fed through it. The equipment necessary to drive the shear is minimal in cost and complexity.

The shearing operation results in a relatively clean cut through the pipe and does not produce troublesome metal chips and debris such as normally produced by drilling. A leak proof seal is readily achieved since loose particles are generally not present and because the seal may be formed on a fresh surface produced by the shear.

The shear remains in the pipe during stoppage. The sealing member or plug-off piston may be extended as soon as the shear has completed its stroke. Earlier procedures of removing the cutting element and replacing it with the sealing member through a lock are eliminated. Fluid need not be exposed during the operations of cutting into and sealing the pipe.

DESCRIPTION OF THE PREFERRED EMBODIMENT

Figures 1, 2:
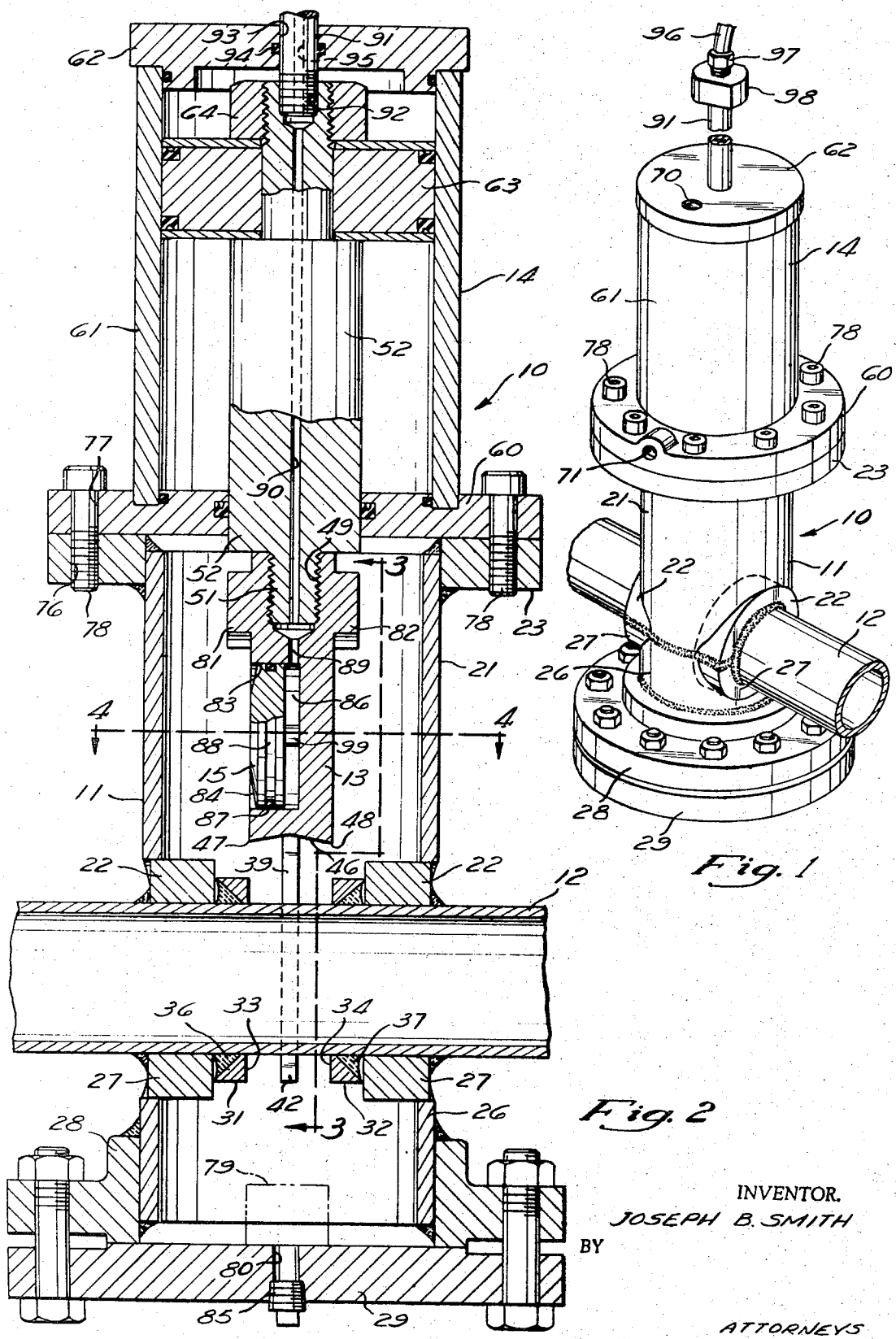
FIG. 1 is a perspective view of a pipe plugging apparatus constructed in accordance with this invention.
FIG. 2 is a cross-section of the apparatus taken longitudinally through a pipe on which it is mounted.

A pipe plugging apparatus 10 embodying this invention includes, principally, a fluid tight housing 11 welded to the exterior of a conduit or pipe 12, a shear head 13 within the housing 11, a hydraulic piston and cylinder actuator 14 mounted on the housing to drive the shear through the pipe, and an externally operated plug-off piston 15 mounted in the shear head. The housing 11 is welded at a desired point along the pipe 12, and the shear head 13 is forced through the wall of the pipe. The plug-off piston 15 is then actuated to seal against a sheared face of the pipe.

The housing 11 is a steel weldment comprising upper and lower sections. The upper section of the housing 11 includes a cylindrical portion 21 of steel tubing or pipe, a pair of semicylindrical adapter sleeves 22 forming a pipe saddle, and an upper circular flange 23.

The lower section of the housing 11 is similar in construction to the upper section. The lower section comprises a relatively short cylindrical tube or pipe 26, a pair of semicylindrical adapter sleeves 27 identical to the sleeves 22 of the upper section, and a lower flange 28. The lower flange 28 is preferably a standard ASA pipe flange and is sealed by an ASA flange cap 29. The apparatus 10, of course, may be installed on a pipe having an attitude other than the horizontal attitude shown in the Figures. It should be understood that the portions 21 and 26 may be formed as rectangular if desired rather than cylindrical as illustrated.

In the preferred embodiment, before the housing 11 is assembled and welded to the pipe, a pair of segmented reinforcing rings 31 and 32 are welded to the exterior of the pipe 12. Preferably, each of these reinforcing rings comprises semicircular upper and lower segments. As discussed below, the reinforcing rings are located with their radial faces 33 and 34 along the eventual shear planes through the pipe 12. A jig or fixture, not shown, may be used to align the reinforcing rings 31 and 32 perpendicular to the axis of the pipe 12 and accurately space them apart a distance equal to the width of the shear head 13. The reinforcing rings are formed with a conical undercut surface at opposite sides to permit circumferential weld beads 36 and 37 to be laid close to the eventual shear lines. This arrangement insures that the weld beads and weld hardened pipe sections are outside the shearing area. The support provided by the rings 31 and 32 and the weld beads 36 and 37 prevents the pipe 12 from collapsing under the shear force.

Figures 3, 4:
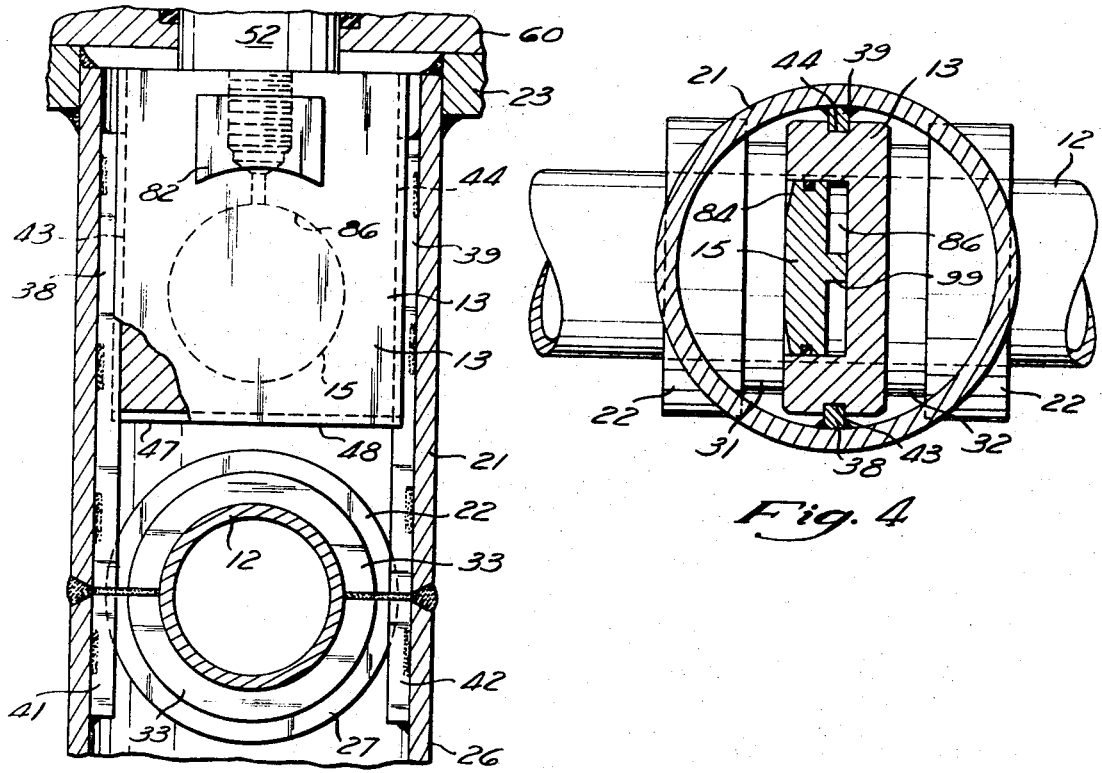
FIG. 3 is a fragmentary cross-section of the apparatus as indicated by the lines 3—3 in FIG. 2.
FIG. 4 is a cross-section of the apparatus as indicated by the lines 4—4 in FIG. 2 with the lower flange omitted.

After the reinforcing rings 31 and 32 are welded to the pipe 12, the upper and lower sections of the housing 11 are then welded to the pipe. Preferably, the reinforcing rings 31 and 32 and the adapter rings 22 and 27 are proportioned so that the upper and lower sections of the housing 11 are aligned to the pipe by the reinforcing rings 31 and 32. As shown in FIG. 3, the adapter sleeves 22 and 27 and the halves of the reinforcing rings 31 and 32 are somewhat short of being true semi-circles so that the upper elements do not contact the lower elements at the joint line between the upper and lower sections of the housing 11. Likewise, the upper and lower cylindrical tubes 21 and 26 do not contact at the joint line. The separation between the upper and lower housing elements insures adequate weld penetration at the joint line for a fluid tight joint. The boxlike construction of the housing provides a strong structure to withstand end and radial loads on the pipe after it is severed. In certain instances, it may be desirable to clamp the upper and lower housing sections together on the pipe 12 in the same manner as a conventional pipe saddle is bolted together rather than welding the housing to the pipe.

The shear head 13 is guided in the housing 11 for radial movement relative to the pipe by a pair of guides 38 and 39. The guides 38 and 39 are welded, diametrically opposed, to the interior of the cylindrical portion 21 of the upper section of the housing 11. A similar set of guides 41 and 42 are welded to the interior of the lower section of the housing 11 in alignment with the upper guides 41 and 42 respectively. The shear head 13, a rectangularly shaped member, has a pair of grooves 43 and 44 formed along its sides which engage the guides 38-42. The shear head 13 is in alignment and moves parallel to a plane perpendicular to the axis of the pipe 12. A lower face 46 of the shear head 13 is beveled to provide a pair of cutting edges 47 and 48. The upper end of the shear head 13 is provided with a tapped hole 49 for mounting the shear head on a threaded extension 51 of a piston rod 52 of the hydraulic actuator 14.

The hydraulic actuator 14 is conventional in construction and some of its components may be stock items supplied by manufacturers of hydraulic actuators. The hydraulic actuator 14 comprises, principally, a lower cylinder end flange 60, a cylinder 61, an upper cylinder end or head 62, a piston 63 and the piston rod 52. The piston 63 is retained on the rod 52 by a threaded nut 64. The actuator 14 is of the double acting type and is provided with a port 70 in the upper cylinder head 62 and a port 71 in the lower cylinder end flange 60. The port 70 communicates with the area or chamber between the upper cylinder head 62 and the upper face of the piston 63 while the other port 71 communicates with the chamber between the lower cylinder end 60 and the lower face of the piston.

A series of threaded holes 76 are provided around the upper flange 23 of the housing 11 in alignment with a series of mounting holes 77 provided in the cylinder end flange 60. When a set of bolts 78 are tightened in these flange holes 76 and 77, the cylinder end flange 60 seals the upper section of the housing 11.

The shear head 13 is forced through the wall of the pipe 12 by admitting pressurized fluid to the upper cylinder port 70. The source of this pressurized fluid may be any type of pump having a suitable capacity. The required pump pressure will, of course, depend on the chosen size of the actuator 14 and the size and weight of the pipe 12. It may be appreciated that the hydraulic actuator 14 and the pump are relatively simple in construction and minimal in cost when compared with apparatus required to drill a full size hole through the pipe. Other types of actuators such as a jackscrew may, alternatively, be employed to drive the shear head through the pipe. When it is necessary to reduce the maximum shearing force, circumferential grooves are cut into the pipe wall adjacent the reinforcing rings. Further, it may be possible to eliminate the need for the reinforcing rings 31 and 32 if the grooves are cut deep enough into the pipe wall to adequately weaken it.

Pressurized fluid through the upper port 70 drives the piston 63 downward in the cylinder 61 from the position shown in FIG. 2. As the piston 63 moves downward, it forces the cutting edges 47 and 48 of the shear head 13 into the wall of the pipe 12. As the piston 63 continues its stroke the shear head passes between the reinforcing rings 31 and 32 and progressively cuts through or opens the wall of the pipe 12. A slug 79 having a length approximately equal to the spacing between the reinforcing rings 31 and 32 is sheared from the pipe 12 and displaced into the lower section of the housing 11. The slug 79 collapses or is flattened from its original cylindrical shape as it is sheared. The slug 79 is shown in phantom in FIG. 2 in its final form.

A pair of indexing shoulders 81 and 82 provided on the shear head 13 engage the upper portions of the reinforcing rings 31 and 32 to limit the stroke of the actuator and to center the plug-off piston 15 with the axis of the pipe 12. The shear head 13, when extended into its indexed position substantially restricts or seals the pipe 12 against fluid flow.

The plug-off piston or disc 15 is slidably positioned in a recess or bore 83 in a vertical face of the shear head 13. The axis of the bore 83 is aligned with the axis of the pipe 12 when the shear head 13 is indexed to the reinforcing rings 31 and 32. The plug-off piston 15, as shown in FIG. 2, lies to the right of a vertical plane passing through the adjacent cutting edge 47 so that the piston does not interfere with the radial face 34 of the reinforcing ring 31 and the sheared face of the pipe as the shear head 13 is forced through the pipe. After the plug-off piston 15 is aligned to the center of the pipe 12, it may be extended axially to seal against the sheared face of the pipe formed by the cutting edge 47.

The seal is effected in the same manner as that of a poppet valve. A beveled or conical surface 84 is provided on the leading face of the piston 15 to engage the inner edge of the sheared pipe face. The contact or sealing area between the sheared face of the pipe and the piston 15 is thereby minimized to insure that the pipe will be sealed around its full perimeter. If desired, the entire plug-off piston 15 or only its sealing surfaces may be made of a relatively soft metal or other material to improve its sealing characteristics.

A drain plug 85, threaded into a hole 80 through the lower flange cap 29, may be removed or replaced with a pressure gauge to determine the effectiveness of the seal formed by the plug-off piston 15. The righthand section of pipe as shown in FIG. 2 is not sealed from the housing 11 by the shear head as tightly as the lefthand section, but communication between the right and lefthand sections is eliminated. Where it is necessary to completely seal both pipe sections from the housing 11, a pair of oppositely facing pistons may be provided.

The plug-off piston 15 is extended or operated hydraulically. A hydraulic chamber 86 is formed in the shear head 13 by the bore 83 and the piston 15. An elastic O-ring 87 is provided in a circumferential groove 88 around the cylindrical surface of the piston 15 to seal the hydraulic chamber 86 as the piston 15 slides in the bore 83. A fluid path is provided through the actuator 14 into the chamber 86 to permit external actuation of the piston 15. The fluid path includes a passage 89 between the hydraulic chamber 86 and the tapped hole 49 in the upper portion of the shear head and a longitudinal passage or hole 90 extending through the center of the piston rod 52.

A projection or boss 99 on the plug-off piston 15 abutting the end of the bore 83 prevents the piston from closing off the orifice 89. At the other end of the actuator 14, a hollow bolt or rod 91 is threaded into a hole 92 at the upper end of the piston rod 52. The bolt 91 is slidable in a bore 93 in the center of the upper cylinder head 62. An elastic O-ring 94 is positioned in a groove associated with the bore 93 to seal the upper portion or chamber of the actuator 14 as the bolt 91 slides in the bore 93. A passage 95 through the length of the bolt 91 completes the fluid path from the hydraulic chamber 86 in the shear head 13. A flexible hydraulic line 96 and an associated fitting 97 are connected to a head 98 of the bolt 91 to carry pressurized hydraulic fluid from an external pump, not shown, to the hydraulic chamber 86 in the shear head 13. Ideally, this hydraulic pump or its circuit will include a locking valve to hold the plug-off piston 15 in its sealing or extended position.

Pipe plugging apparatus, such as disclosed here, may be used for repairing, testing, or making additions to existing pipelines without draining them. In these applications, a pipe will not ordinarily be blocked indefinitely. In the apparatus 10 of the present invention, the shear head 13 may be retracted to unblock the pipe. This may be accomplished by first venting the fluid in the hydraulic chamber 86, for instance, by opening the above mentioned hydraulic lock, or by disconnecting the fitting 97 on the bolt 91 to permit the plug-off piston to retract. The shear head 13 is raised by admitting pressurized fluid to the lower port 71 in the actuator 14 and exhausting the upper port 70. The beveled surface 84 on the plug-off piston 15 operates as a cam surface against the sheared face of the pipe to retract the piston 15 into the bore 83 as the shear head 13 is elevated. Additionally, the fluid pressure in the pipe 12 will force the piston 15 into the bore 83 when the fluid in the chamber 86 is vented.

As mentioned above, the slug sheared from the pipe is displaced into the lower section of the housing 11. To preclude the possibility of the slug finding its way back into the pipe stream by vibration or fluid flow, the slug may be removed from the lower section of the housing before the shear head 13 and the plug-off piston 15 are retracted from their sealing positions. The flange cap 29 on the lower portion of the housing may be unbolted for this purpose.

It is expected that in most cases the actuator 14 will be left on the housing 11 for the life of the pipeline. This would permit the apparatus 10 to be used as a valve at any future time. To retain the shear head 13 in its upward position during periods of non-use, the hollow bolt 91 may be replaced by a shorter bolt not having a central passage. This shorter retaining bolt would thread into the threaded hole 92 in the upper end of the piston rod 52 and its head would rest on the outer side of the upper cylinder head 62.

If circumstances make it undesirable to leave the actuator 14 in place on the housing 11 after a pipe has been temporarily sealed, a gate valve or similar device may be positioned between the housing 11 and the lower end flange 60 of the actuator 14. The gate valve would be arranged to form a lock or pressure equalizing chamber between itself and the lower end flange 60 of the actuator 14. This would permit the actuator 14 to be removed without the escape of pressurized fluid from the pipe 12. Of course, the stroke of the actuator would necessarily be lengthened for passage of the shear head 13 through the gate valve.

It is important that the housing 11 properly seal the pipe after it has been sheared whether or not the actuator is eventually removed. The integrity of the weld securing the housing 11 to the pipe and the seal at the upper and lower flanges 23 and 28 of the housing may be tested before the pipe is sheared by drilling a small hole through the wall of the section to be sheared. If a leak is discovered, it may be fixed after first plugging the drilled hole.

Although a preferred embodiment of this invention is illustrated, it is to be understood that various modifications and rearrangements of parts may be resorted to without departing from the scope of the invention disclosed and claimed herein.

What is claimed is:

1. An apparatus for blocking a longitudinally extending conduit carrying fluid under pressure comprising a fluid tight housing adapted to be secured to the exterior of an intermediate portion of the conduit, a cutter within said housing including means to sever a section having a predetermined axial length from the wall of the conduit within the housing from remaining portions of the conduit, said cutter being adapted to sever said section from the conduit at two spaced planes while maintaining the cross sectional configuration of the remaining portions, actuator means for moving said cutter transversely into said conduit to sever its wall and form said section, and blocking means within said housing for blocking flow of fluid along said conduit on at least one side of said cutter while said cutter extends into said conduit, said blocking means being retractable from said conduit to permit reestablishment of flow through said remaining portions of said conduit.

2. An apparatus according to claim 1 wherein said cutter carries said means for blocking said conduit.

3. An apparatus according to claim 2 wherein said blocking means includes a sealing surface which sealingly engages a severed end surface of said conduit formed by said cutter as it severs said conduit.

4. An apparatus as set forth in claim 1 wherein said blocking means includes a movable sealing member and a variable volume hydraulic chamber operably connected to move said sealing member into sealing engagement with a surface bounded by said housing to thereby close a flow path opened by said cutter when it severs said wall.

5. An apparatus for blocking a conduit carrying a fluid comprising a fluid tight housing adapted to be secured to the exterior of a conduit wall, a shear mounted in said housing, guide means supporting said shear for transverse movement relative to said conduit, actuator means for forcing said shear through said wall into the interior fluid passage defined thereby, a sealing member movable into sealing engagement with a surface enclosed by said housing to thereby block a fluid flow path opened by said shear when it is forced through said wall, and a variable volume hydraulic chamber operably connected to said sealing member to move said member into said sealing engagement with said surface independently of operation of said actuator means.

6. An apparatus for blocking a conduit carrying a fluid comprising a fluid tight housing adapted to be secured to the exterior of a conduit wall, a shear mounted in said housing, said shear having a pair of axially spaced cutting edges along one of its sides, guide means supporting said shear for transverse movement relative to said conduit, actuator means for forcing said shear through said wall into the interior fluid passage defined thereby with each cutting edge operating to shear the wall of said conduit at axially spaced zones, said cutting edges being arranged to sever an axial section from the conduit between said spaced zones while not substantially disturbing the cross sectional opening of the remaining conduit portions at said zones, said shear blocking flow of fluid along said conduit when positioned in said interior passage.

7. An apparatus according to claim 6 wherein said shear includes sealing means carried by said shear into said conduit, said sealing means including a surface movable relative to said shear in the longitudinal direction of said conduit, and means for forcing said sealing surface into sealing engagement with a surface portion of said conduit.

8. An apparatus according to claim 7 wherein said sealing surface includes a portion adapted to engage a sheared face of the conduit formed by one of said cutting edges.

9. A shear apparatus in combination with a conduit carrying a fluid comprising means rendering the wall of the conduit at planes of shear weaker than adjacent areas, a fluid tight housing secured to the exterior of a conduit wall, a shear having a pair of axially spaced cutting edges mounted in said housing, guide means supporting said shear for transverse movement relative to said conduit, actuator means for forcing said shear through said wall along said planes of shear into the interior fluid passage defined thereby, said means weakening the conduit wall at the planes of shear allowing cutting movement of said shear through said wall while maintaining the original cross sectional configuration of the conduit portions outward of said weakened planes of shear, said shear blocking flow of fluid along said conduit when positioned in said interior passage.

10. An apparatus as set forth in claim 9 wherein said means rendering the wall weaker than at adjacent areas are reinforcing rings secured to the exterior of the conduit.

11. An apparatus as set forth in claim 10 wherein said reinforcing rings are welded to the outer periphery of the conduit.

12. An apparatus for blocking a longitudinally extending pipe containing pressurized fluid comprising a fluid tight housing adapted to be secured around a portion of said pipe, guide surfaces within said housing, a shear guided by said guide surfaces for reciprocatory radial movement relative to said pipe, said shear having a pair of axially spaced cutting edges along one side, means for forcing said shear through the wall of said pipe, said shear having another side generally perpendicular to said first mentioned side and including a recess therein, a sealing member within said recess and movable relative to said shear axially along said pipe between a first position at which it lies between planes transverse to said pipe and containing said cutting edges and a second position at which a portion of it lies outside the area between said planes and in engagement with a sheared face of said pipe formed by one of said cutting edges, and means to move said sealing member from said first position to said second position and maintain said member at said second position in sealing engagement with the sheared pipe face to thereby block the associated portion of said pipe.

13. An apparatus according to claim 12 including indexing means for aligning said sealing member radially with said pipe.

14. An apparatus according to claim 12 wherein said sealing member is a disc having a diameter greater than the inner diameter of said pipe, said disc engaging the inner edge of the sheared face of said pipe formed by said one cutting edge.

15. An apparatus for blocking a longitudinally extending pipe containing pressurized fluid comprising a fluid tight housing adapted to be secured around a portion of said pipe, guide surfaces within said housing, a shear guided by said guide surfaces for reciprocatory radial movement relative to said pipe, said shear having a pair of axially spaced cutting edges along one side, means for forcing said shear through the wall of said pipe, said shear having another side generally perpendicular to said first mentioned side and including a recess therein, a sealing member within said recess and movable relative to said shear axially along said pipe between a first position at which it lies between planes transverse to said pipe and containing said cutting edges and a second position at which a portion of it lies outside the area between said planes and in engagement with a sheared face of said pipe formed by one of said cutting edges, and means to move said sealing member from said first position to said second position and maintain said member at said second position in sealing engagement with the sheared pipe face to thereby block the associated portion of said pipe, said means for forcing said shear through the wall of said pipe being a hydraulic piston cylinder actuator having a piston rod, said shear being mounted on said piston rod, said means to move said sealing member including a hydraulic chamber formed by said recess and said disc, and a passage in said piston rod communicating with said hydraulic chamber to permit external control of movement of said sealing member.

16. An apparatus according to claim 12 wherein said housing includes a zone adapted to receive a section of pipe completely sheared off of remaining portions of the pipe by said pair of cutting edges.

17. An apparatus as set forth in claim 16 wherein a segment of said housing is removable for access and removal of said sheared pipe section from said housing.

18. An apparatus according to claim 17 wherein a plug is provided for draining said housing when said sealing member is in sealing engagement with the sheared pipe face.

19. An apparatus according to claim 17 wherein said fluid tight housing comprises a weldment formed of upper and lower saddlelike portions welded to the exterior of said pipe.

20. A shear for plugging a pipe comprising a body having a pair of cutting edges along one of its sides, the cutting edges lying in separate parallel planes, guide surfaces extending parallel to said planes and adapted to guide the shear in a direction parallel to said planes, means on said body for engagement with an actuator, said body having a face extending generally parallel to said planes, a circular recess in said face, a circular plug slidable in said recess in a direction perpendicular to said planes between a first position in which it is within the area between said planes and a second pipe plugging position in which a portion of it is outside said area, and means in said body for moving said plug from said first position to said second position.

21. A shear for plugging a pipe as set forth in claim 20 wherein said body includes an indexing surface adapted to engage a surface having a fixed relation to the center of the pipe, the radial center of said circular plug having a similar relationship with said indexing surface such that said plug is radially aligned with the center of the pipe when said indexing surface engages said surface having a fixed relation to the center of said pipe.

* * * * *